Aug. 18, 1925.
P. J. FITZGERALD
COMMUTATOR
Filed Feb. 12, 1925
1,550,528
2 Sheets-Sheet 1
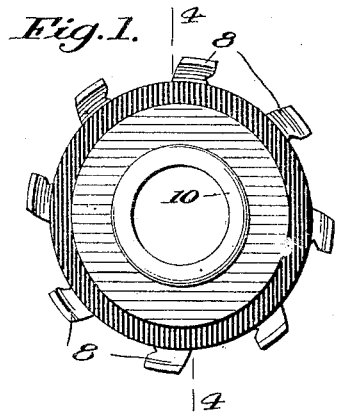
Fig.1.
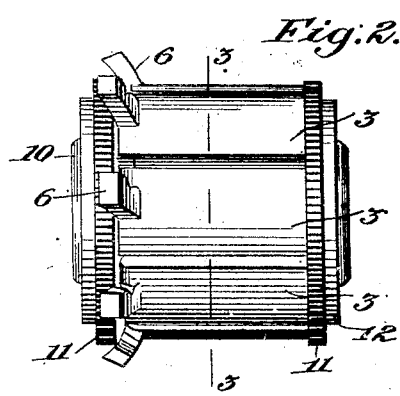
Fig.2.
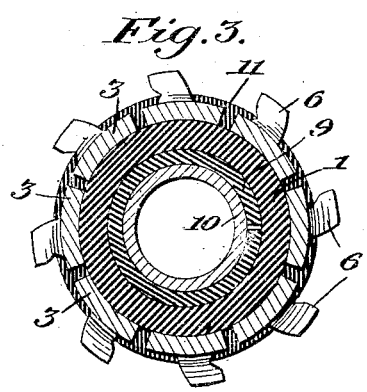
Fig.3.
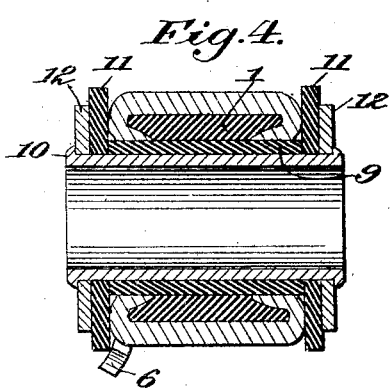
Fig.4.
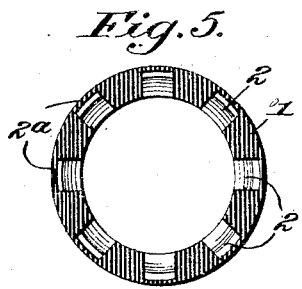
Fig.5.
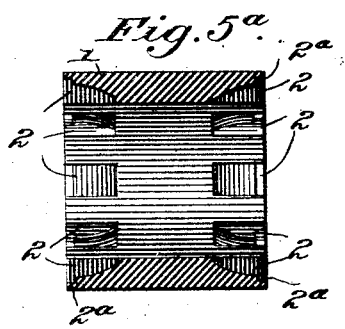
Fig.5ª.
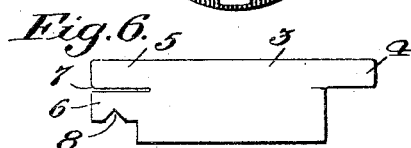
Fig.6.
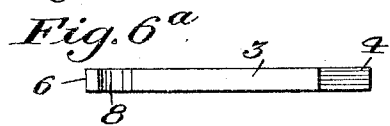
Fig.6ª.
Inventor:
Patrick J. Fitzgerald
By Sturtevant & Mason
Att'ys.

Aug. 18. 1925.
P. J. FITZGERALD
COMMUTATOR
Filed Feb. 12, 1925
1,550,528
2 Sheets-Sheet 2
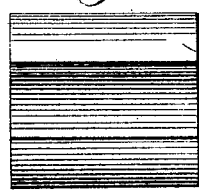
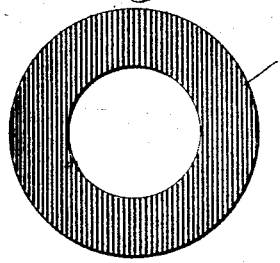
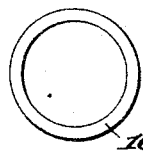
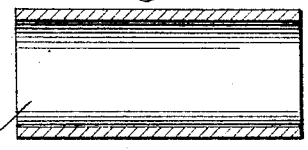
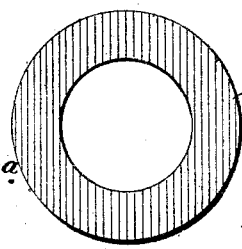
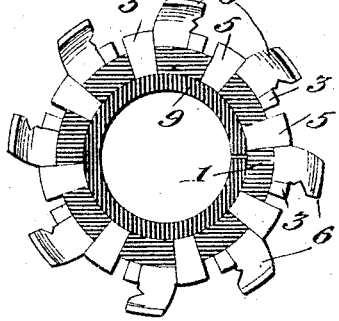
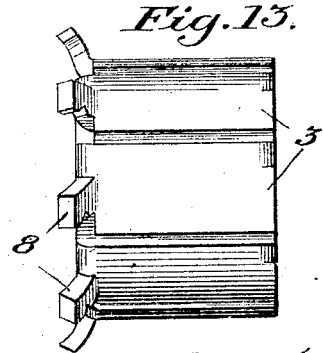
Inventor:
Patrick J. Fitzgerald
By Sturtevant & Mason
Att'ys.

Patented Aug. 18, 1925.

1,550,528

UNITED STATES PATENT OFFICE.

PATRICK J. FITZGERALD, OF TORRINGTON, CONNECTICUT, ASSIGNOR TO THE FITZGERALD MFG. CO., OF TORRINGTON, CONNECTICUT, A CORPORATION OF CONNECTICUT.

COMMUTATOR.

Application filed February 12, 1925. Serial No. 8,800.

*To all whom it may concern:*

Be it known that I, PATRICK J. FITZGERALD, a citizen of the United States, residing at Torrington, in the county of Litchfield, State of Connecticut, have invented certain new and useful Improvements in Commutators, of which the following is a description, reference being had to the accompanying drawing and to the figures of reference marked thereon.

This invention relates to improvements in the construction and design of commutators, and more particularly to commutators of small size for use with electric motors for minor devices.

One of the objects of this invention is to provide a commutator construction in which the several parts may be assembled by machine operations in a minimum time and with entire assurance against later displacements.

Another object is to provide a commutator construction in which the several conductive elements are held in a rigid spaced relation to each other, and are permanently insulated from the support.

A further object is the provision of a commutator construction in which the several component parts may be readily and rapidly formed by machinery.

A further object is the provision of a commutator which is unitary in its general assemblage and is protected against physical disruption.

With these and other objects in view as will appear in the course of the following description, there is represented on the accompanying drawing a preferred form of execution of this invention of which:

Figure 1 is an end view of the assembled commutator;

Fig. 2 is a side view of the same;

Fig. 3 is a cross section on the line 3—3 of Fig. 2;

Fig. 4 is a cross section on the line 4—4 of Fig. 1;

Figs. 5 and 5ª are respectively an end elevation and an axial section through the formed insulating body;

Figs. 6 and 6ª are respectively a face view and an end elevation of a commutator segment as stamped from a sheet;

Figs. 7, 7ª and 7ᵇ are respectively a front view, a side elevation, and a bottom view of the same segments after being preliminarily formed;

Figs. 8 and 8ª are respectively the end elevation and axial section of the metal sleeve which serves as a support upon the shaft to which the commutator is finally applied;

Figs. 9 and 9ª are respectively a face view and an axial section of one of the metal washers, to assemble the commutator;

Figs. 10 and 10ª are respectively a side view and an end elevation of the insulating sleeve employed to separate the segments from the metal sleeve;

Figs. 11 and 11ª are respectively a face view and an axial section of an insulating washer;

Fig. 12 is a section on the line 12—12 of Fig. 2, and

Fig. 13 is a side elevation of a partly assembled commutator.

This commutator is constructed with a supporting bushing 1 of insulating material, as shown in Figures 5 and 5ª. These bushings are constructed of stout fiber or similar material, and the first operation consists in gouging a series of regularly spaced notches 2, 2 on the internal surface of the bushing and at each end, equal in number to the segments desired in the finished commutator. These notches are formed with their bottoms on a slight curve, and terminating at the ends of the sleeve in weak webs 2ª which are easily broken through in the operations of assembling.

The commutator segments themselves are punched from sheet copper by an ordinary punch press or similar device, into the shape shown in Figures 6 and 6ª. The segment 3 has a projecting lug 4 at one end, which will hereafter be designated as the "free" end, since it is the end farthest from the armature when the device is assembled in a motor. A similar lug 5 at the armature end is separated from an attachment lug 6 by a thin kerf or slit 7 which ordinarily is formed without removing metal. The attachment lug 6 is formed with a notch 8 for a purpose which will be set forth hereafter.

The segment blank is then curled in a punch press into the shape shown in Figures 7, 7ª and 7ᵇ. The lugs 4 and 5 are bent downwardly and inwardly to somewhat more than right angles, as shown in Fig. 7ª. In this shape, the segment is ready for assembly with the bushing 1. It is apparent that the segment blanks 3 may be cut and formed at one operation if so desired.

In the operation of assembling the segments 3 in the insulating bushing 1, the segments are placed or slipped over the edges of the bushing, with their faces outward, and the lugs 4, 5 pointing inward over the edges of the bushing and fitting into the notches 2. The loosely assembled member is then slipped into the die of appropriate size and a mandrel brought down to curl the lugs 4, 5 inward and into the shape shown in Fig. 4. It is desirable in this operation or operations to leave the inner surface formed by the bushing 1 and the lugs 4, 5 of the several commutator segments as nearly cylindrical as possible. The unit thus assembled is not susceptible to disarrangement, since the commutator sections have been first held and later locked in predetermined and accurate positions by the engagement of the lugs 4, 5 in the notches 2, 2.

The next operation comprises the insertion of the split insulating sleeve 9 within the bushing 1. The natural resiliency of the sleeve 9 causes it to expand and tightly lock itself within the unit assembly. The metal sleeve 10 is then forced through this sleeve 9 until it projects a like distance at each end. An insulating washer 11 and a metal protecting and stiffening washer 12 is then placed on each end of the metal sleeve 10, and the ends of the sleeve 10 are spun over or riveted in any usual manner. The assembly of the device is now complete as shown in Figures 1 and 2.

The notches 8 in the edges of the segments protect a part of the surface of the segment against oiliness during assembly, and renders it easy for the workman to solder the armature leads to the segments.

The form set forth in detail is given solely by way of illustration, and any modification desirable may be made within the scope of the appended claims.

Having thus described the invention, what I claim as new and desire to secure by Letters-Patent, is—

1. In a commutator, a central insulating bushing, a series of spaced commutator segments mounted on and having their inwardly projecting ends turned under said bushing, insulation on the ends and inner surface of said segments and bushing, and a central metal sleeve integrally locking said insulation in position.

2. In a commutator, metal commutator segments having lugs at each end thereof, an insulating bushing having a plurality of spaced notches at each end thereof to receive and maintain in spaced relation the lugs of said segments.

3. In a commutator, an insulating bushing having a plurality of spaced commutator segments gripping the said bushing at each end, a layer of insulation within said bushing and segments, an insulating washer at each end of said bushing and segments, and a metal sleeve clamping said washers against said segments, said insulation separating said segments and said sleeve.

4. In a commutator, a foundation insulating sleeve having a plurality of notches formed on its interior face at the ends, and segment members having attachment lugs forced into said notches and deformed by said sleeve.

5. The method of making a commutator structure which consists in providing the interior of an insulating sleeve with a plurality of spaced notches, placing a plurality of pre-formed commutator segments upon said sleeve and engaging in said notches, and swaging the portions of said segments into permanent location in said notches.

6. In a commutator, a foundation insulating sleeve having a plurality of notches formed on its interior face at the ends, and segment members having attachment lugs forced into said notches and deformed to an internal diameter substantially equal to the internal diameter of the sleeve.

7. In a commutator, an insulating bushing having a smooth cylindrical peripheral surface and notches on its internal surface adjacent the ends, a plurality of segment members mounted on the peripheral surface of said bushing and having their ends swaged into the notches, and insulating means protecting the inward portions of said segment members.

In testimony whereof, I affix my signature.

PATRICK J. FITZGERALD.